2 Sheets--Sheet 2.
H. M. ASCHENBRENNER.
Sugar Manufactures.
No. 146,040. Patented Dec. 30, 1873.
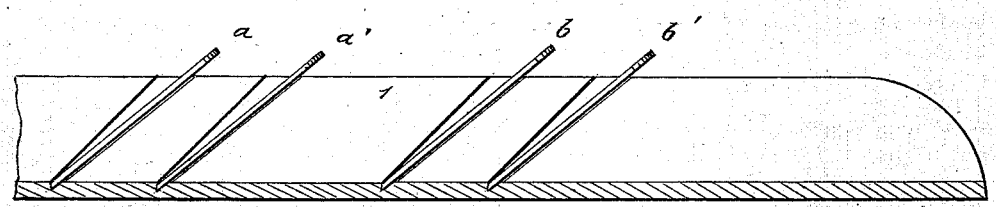
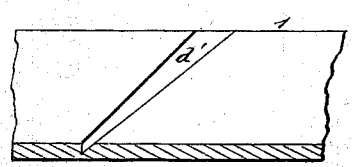
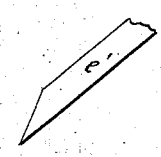
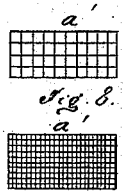
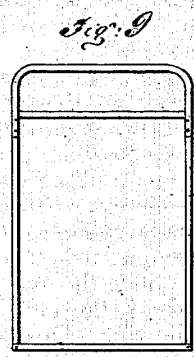
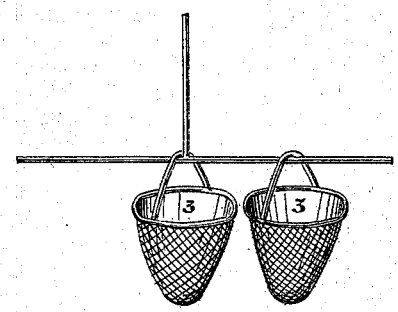
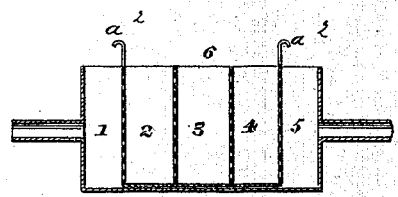
WITNESSES.
Chas. Nida
C. Sengwick
INVENTOR.
H. M. Aschenbrenner
BY
ATTORNEYS.

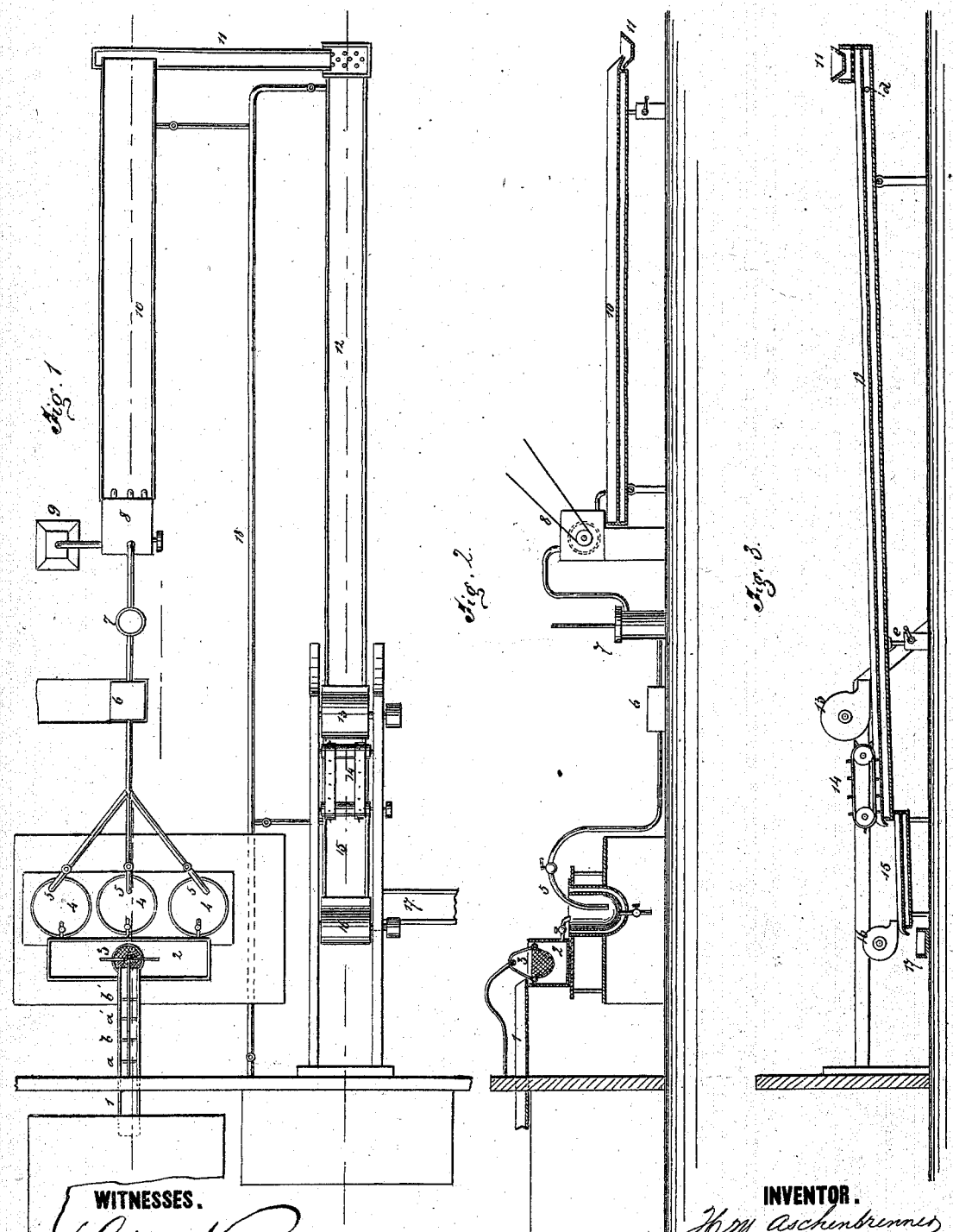

UNITED STATES PATENT OFFICE.

HERMAN M. ASCHENBRENNER, OF HAVANA, CUBA, ASSIGNOR TO HIMSELF AND THEOPHILUS MASAC, OF SAME PLACE.

IMPROVEMENT IN SUGAR MANUFACTURES.

Specification forming part of Letters Patent No. 146,040, dated December 30, 1873; application filed November 1, 1873.

*To all whom it may concern:*

Be it known that I, HERMAN M. ASCHENBRENNER, of Havana, Cuba, have invented a new and useful Improvement in Sugar-Making, of which the following is a specification:

The object of the invention is to produce from sugar-cane, beet-root, and the like, with the least possible loss of saccharine matter, expenditure of labor and money, and in the shortest possible time, the largest amount of dry, pure, and naturally white sugar, without any molasses whatever, and in any marketable shape desired, by a new method in which it is sought to avoid the manifold mistakes under which the present method of sugar-making labors, the most prominent of which are the following: Large waste of saccharine matter in the extraction of cane-juice, formation of gases produced by boiling of the juice, and most injurious to the quality of the sugar; loss by caramelization; loss by formation of molasses, production of comparatively inferior sugar, notwithstanding the costliest apparatus employed, large waste of fuel, water, labor, time, and money.

The following is a description of the said method or process and the apparatus used:

Figure 1 is a plan view of the apparatus. Fig. 2 is a longitudinal sectional elevation. Fig. 3 is a longitudinal sectional elevation of Fig. 1. Fig. 4 is an enlarged view of a portion of the apparatus as represented in Fig. 2, showing the details. Figs. 5, 6, 7, 8, and 9, are details of the filtering apparatus used in the canal which conducts the juice to the kettles. Fig. 10 represents the removable flannel filters. Fig. 11 is a sectional elevation of the suction-filter.

Similar letters of reference indicate corresponding parts.

The juice passes from the grinding-mill into a conveying-tank, 1, Figs. 1 and 2, with two sets of filters, $a\ b\ a'\ b'$, which operate alternately, so that when one set is employed the other can be taken out and cleaned, each set having two different grades, which are calculated to stop the passage of mechanical impurities floating in the juice. The conveying-tank discharges into the flannel filter 3, which finishes this work. From the filters 3 the juice falls in the tank 2, which has three outlets corresponding with three open kettles, 4, which latter are provided with a double bottom for the purpose of being heated by steam. In these kettles in successive order, the cane-juice is precipitated by means of lime and magnesia, and the sediment is drawn off by means of the tube in the bottom whenever required. The heating by steam facilitates this process of precipitation. Thus purified, the juice passes through the siphons 5 into the last filter 6, (see Fig. 11,) in which the very last vestige of impurities disappear. This filter is acted upon by the suction-pump 7, which at the same time forces the juice, after being filtered, into the sulphur-box 8. This box, of wood, has inside a paddle-wheel, (stirrer,) shown dotted in Fig. 2, worked by the steam-engine of the mill, and is fed with sulphurous fumes from the adjoining sulphur-furnace 9. The juice upon entering this box is rapidly agitated and stirred up by means of the revolving paddles, and after being thus exposed to the action of the sulphurous acid, it leaves the box in a perfectly bleached condition, passing through suitable openings, in a stream of two-thirds of an inch thickness, upon the metallic box 10 of sheet metal, heated inside by steam, and serving to raise the temperature of the juice to not over 90° centigrade, by a condensation of 32° to 33° Baumé. From here the juice passes into a communicating canal, 11, with an opening at the lower end, through which it flows in a stream of one-half of an inch thickness, upon the inclined plane 12, also of sheet metal, and heated by steam and provided with an outlet, $d$, for the condensed water at its head end, and with a lifter, $e$, at the opposite end, the latter for the purpose of increasing or decreasing the angle of inclination, according to necessity. The juice here can be heated up to 100° to 110° centigrade, and thereby condensed to 40° to 45° Baumé, and the stream reduced toward the lower end of the incline, which it reaches in ten to twelve minutes' time, to a thickness of one-third of an inch. To carry off all the vapor, hasten condensation, and prevent the boiling of the juice, the steam-fan 13 is placed at the lower end of this inclined plane, thus forming a most effective combination of powerful agents and means well adapted to reach the desired end. The juice becomes now so thick that it has to be scraped with the slowly-revolving scraper 14, which is constructed like an endless apron, provided with suitable scraping-blades, and actuated by power transmitted from the engine. 15 is another smaller and more inclined plane, similar to the former one, and also fanned by another fan, 16, from which plane the sugar, already crystallized, is scraped off, by hand or otherwise, into the final receiver 17. 18 is the system of pipes conveying steam to the different parts of the apparatus.

When molasses is desired, a small percentage can be obtained by making the incline steeper, thus hastening the process, and preventing the perfect drying of the sugar by means of the two ventilators, the molasses thus obtained being of the best quality and the finest color.

The time in which the juice passes through the different stages of progress from the mill to the end of the process is forty-five minutes, or thereabout.

This process is equally adapted for beet-sugar.

The filter 6 consists of a metal case, in which is another case having two perforated ends and two perforated partitions forming three compartments, the first, 2, being filled with sponge; the second, 3, with bone-black; and the third, 4, with charcoal. At each end is an empty space, 1 5, for the in-going and out-going juices. The perforated case has handles $a^2$, by which to put it in and lift it out of the outer case, to change one for another for cleaning. One set only of the filters or screens $a\ a^1\ b\ b'$ will be in use, while the other set will be out for cleaning, although both sets are represented in position in the drawings. $d'$, Fig. 5, represents a groove or channel in the side of the tank 1, such as these screens are placed in. $e'$, Fig. 6, represents a portion of the frame of a screen. Figs. 7 and 8 show portions of the two screens of a set in front elevations. Fig. 9 shows the complete frame of a screen in front elevation. Fig. 10 shows an arrangement of flannel screens on a rod, whereby they can be changed without delay by sliding one out of and the other into position.

Having thus described my invention, I claim as new and desire to secure by Letters Patent—

1. The combination, in the manufacture of sugar, of the following processes: First, precipitation of the juice by lime and magnesia, and steam-heat; second, evaporation of the juice in conductors by steam-heat; and, third, evaporation of the juice in conductors by steam-heat and an air-blast, substantially as specified.

2. The combination of conducting-tank 1, filters $a\ b$, flannel filter 3, receiver 2, and double-bottomed steam-heating kettles 4, the tank 1 being arranged to receive the juice from the sugar-mill, substantially as specified.

3. The combination of the kettles 4, siphons 5, filter 6, sulphur-chamber 8, and the evaporating-conductors 10, substantially as specified.

4. The combination of the scraper 14 with the evaporating conductor 12, substantially as specified.

5. The combination of the conducting-tank 1, filters $a\ b$, flannel filters 3, tank 2, kettles 4, filter 6, pump 7, sulphur-chamber 8, evaporating conductors 10 12 15, fans 13, and 16, and the endless scraper 14, substantially as specified.

HERMAN M. ASCHENBRENNER.

Witnesses:
HENRY C. HALL,
   *U. S. Vice Consul General.*
JOS. A. RAPHEL.